Figure 1:
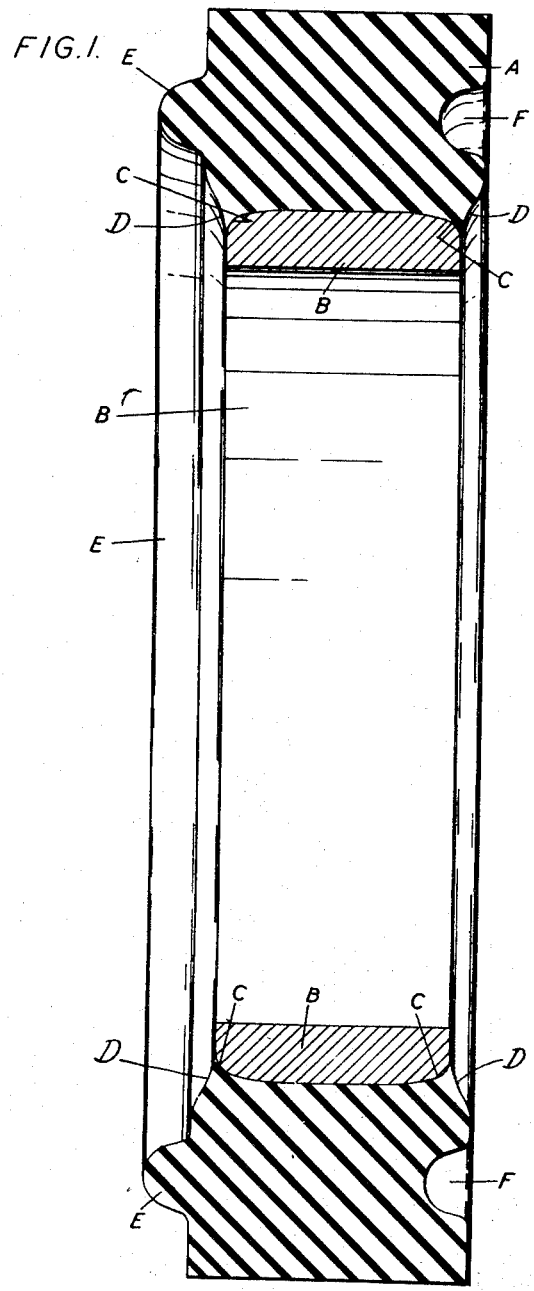

Dec. 11, 1956  H. CLEMENTS  2,773,300
RESILIENT ROLLERS

Filed March 30, 1953  3 Sheets-Sheet 2

INVENTOR
HENRY CLEMENTS
BY
Linton and Linton
ATTORNEYS

Dec. 11, 1956 H. CLEMENTS 2,773,300
RESILIENT ROLLERS
Filed March 30, 1953 3 Sheets-Sheet 3
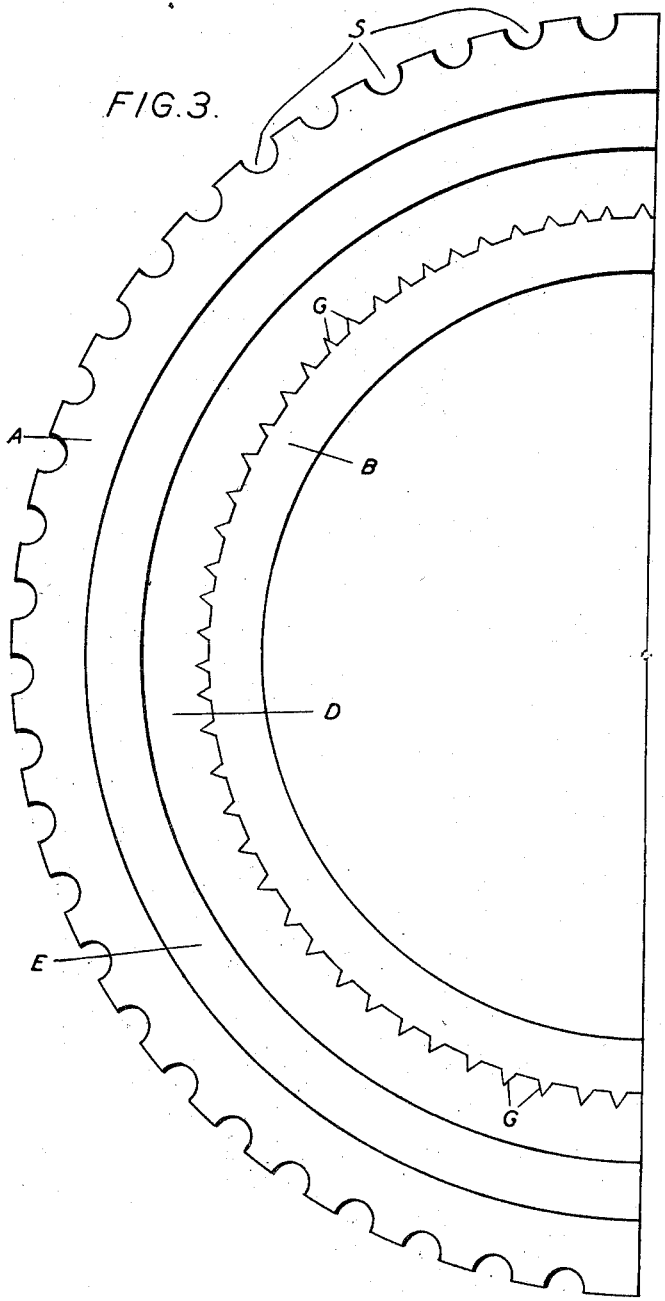
Inventor
HENRY CLEMENTS
By Linton and Linton
Attorneys United States Patent Office 2,773,300
Patented Dec. 11, 1956

2,773,300

RESILIENT ROLLERS

Henry Clements, Surbiton, England, assignor to Andre Rubber Company Limited, Tolworth, Surbiton, England Application March 30, 1953, Serial No. 345,315

Claims priority, application Great Britain July 24, 1952

5 Claims. (Cl. 29—116)

This invention relates to resilient rollers of the kind comprising a series of annular units assembled under axial compression on a common spindle between a pair of end plates, and the invention is designed with more particular, but not exclusive, reference to those rollers which in use are subjected to considerable loading pressure, such for example, as the squeezing rollers of wool washing and similar machines.

The object of the invention is to increase the loading capacity and improve the wearing properties of resilient rollers.

According to the invention a smooth bored unit for a resilient sectional roller, such as a squeezing roller of a wool washing machine, includes a resilient element comprising an annulus of elastomeric material formed, on at least one of its two faces which lie in planes normal to its axis, with a circumferential rebate bordering the inner periphery of the element and in communication with the bore of the unit, said rebate constituting a receptacle for lubricant.

The aforesaid smooth bored unit may either consist wholly of rubber or of synthetic rubber composition, or it may be formed of an annulus of rubber or synthetic rubber or synthetic rubber composition carried by a smooth bored non-deformable annular bush having an axial width less than that of the elastomeric annulus which may either be bonded or keyed mechanically thereto, or alternatively, secured in place frictionally by being stretched on the bush.

In addition to the aforesaid rebate a resilient element for the body of a roller may, if desired, be formed with at least one circumferential groove on one of its two faces which lie in planes normal to the axis of the element and with at least one complementary circumferential rib on the other of said faces, the minimum diameter of said groove or said rib, as the case may be, being greater than the maximum diameter of the adjacent rebate.

When a resilient element is combined with a bush, that surface of the bush which constitutes the seating for the resilient element may be domed in the vicinity of its central portion from which the surface inclines downwardly to the edges of the bush which are preferably radiused. If desired, however, this surface or seating may be flat, dovetailed, serrated or of any other suitable configuration.

Further, when combined with a bush the axial width of each annular resilient element exceeds that of its corresponding bush and the extent to which the surface of the rebate in the element is bevelled or flared is such that when the units are assembled on a spindle and subjected to axial compression by the aforesaid end plates there will be appreciable clearance between adjacent bushes and effective lubricant chambers will be formed between adjacent resilient elements by the rebates therein, a suitable lubricating medium for the units being introduced into the rebates during the assembly of the units on the roller spindle. Thus when the elements are axially compressed on the roller spindle the lubricant chambers, formed by adjacent rebates, are partly closed and some of the lubricant is forced along the inner spindle-contacting surface of the bushes which surface is preferably spirally grooved to facilitate distribution of the lubricant.

Figure 2:
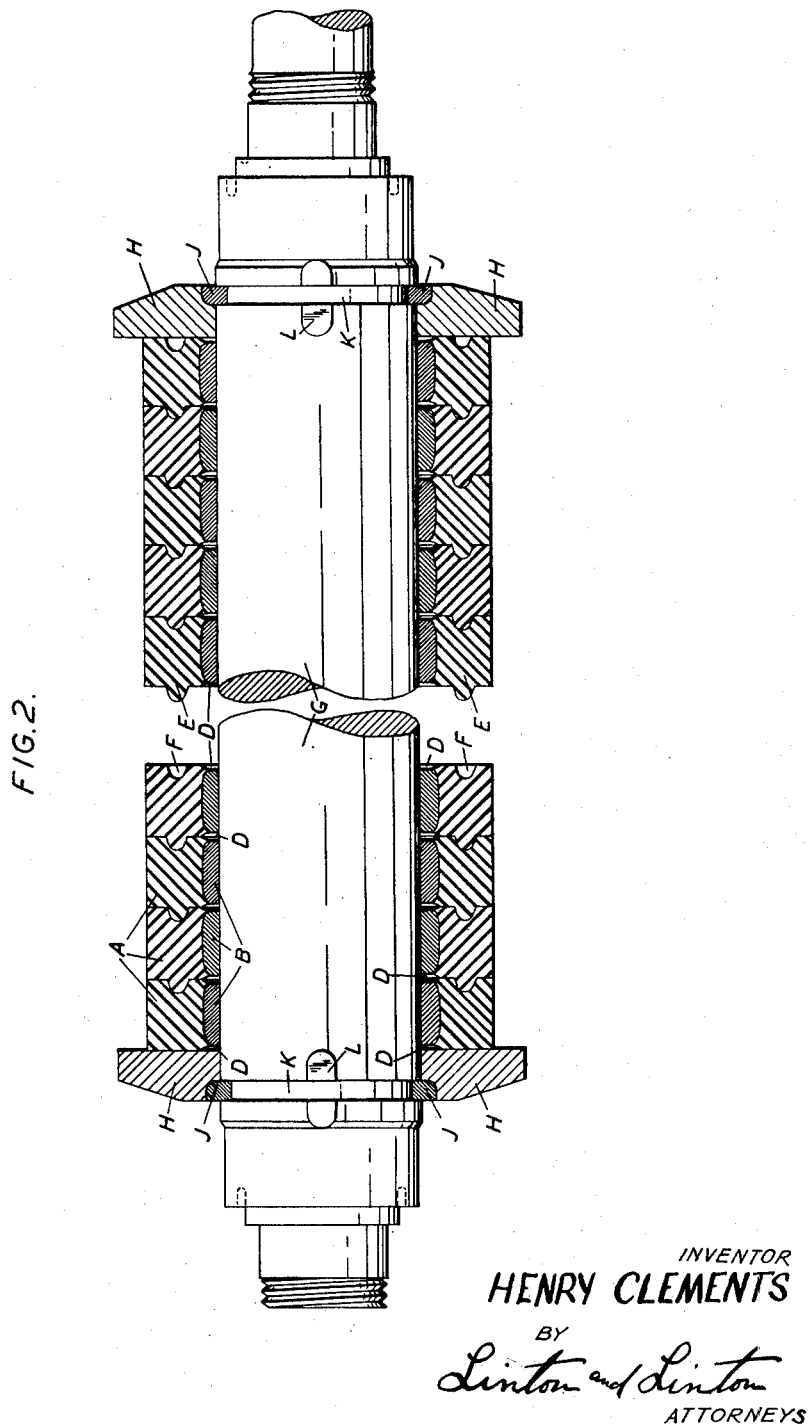

The invention is illustrated, by way of example, in the accompanying drawings in which Figure 1 is a section containing the axis of a single unit composed of a resilient annulus carried by a metal bush, and Figure 2 is a similar section to a smaller scale of a roller assembly. Figure 3 illustrates a modified construction of unit in part end elevation.

Referring to Figure 1, A is an annular element of synthetic rubber whereof the inner circumference is bonded to a metal bush B of which the internal diameter is such that the bush is a sliding fit on the roller spindle for which it is designed, the axial width of said bush being less than that of the annulus A. The aforesaid spiral groove is not shown.

The peripheral surface of the bush B is domed and preferably inclines downwardly towards radiused edges C, C, in order to relieve compressive stress at the edge of the bond between the annulus A and bush B.

On its faces which lie in planes normal to the axis of the unit the annulus A is formed with circumferential rebates D, D, bordering its inner periphery that are bevelled or flared radially outwards from the minimum to the maximum of the axial width of the annulus by an amount exceeding and preferably about double the amount to which the annulus will be compressed when assembled in a roller. In addition, on one of its aforesaid faces the annulus A is formed with an axially projecting circumferential rib E and on the other of its aforesaid faces the annulus A is formed with a complementary circumferential groove F, the minimum diameter of said rib E and of groove F exceeding the maximum diameter of the adjacent rebate D.

Referring now to Figure 2, on the roller spindle G a plurality of the resilient units illustrated in Figure 1 are assembled, with a sliding fit, between two end plates H, H, each of which plates is locked in place by a split collet J received in a groove K formed in the spindle G the plates H, H, being held against rotation relative to the spindle by keys L, L.

One of the end plates H is first secured upon the spindle G, say that at the left in Figure 2, and the appropriate number of annular units are slid on to the spindle after the introduction of a suitable graphitic lubricant into the rebates D and then the second or right-hand end plate H is forced on to the spindle by any convenient known means in order to compress the series of units in an axial direction at the same time partly closing the lubricant chambers and forcing some of the lubricant along the inner spindle-contacting surface of the bushes and the second end plate is then secured in place.

Instead of being caused to cohere to the bush B by bonding the annulus A may be keyed mechanically thereto, as illustrated by way of example in Figure 3 of the accompanying drawings wherein the contacting surfaces of the annulus A and the bush B are serrated as at C in order to key the annulus to the bush.

If desired, the peripheral surface of each of the annular units may be treated, such as by grooving or by moulding with small slots disposed parallel to the axis of each unit for instance as indicated at S in Fig. 3, in order to facilitate the handling of material of a slippery nature by rollers embodying the resilient elements of the invention.

It has been found that when rollers consist of a plurality of the above described resilient elements, the interengagement of one or more axially directed circumferential grooves and one or more complementary axially projecting circumferential ribs disposed on opposite sides of adjacent elements this construction is particularly advantageous when the rollers are destined for use under wet conditions, such as are met with in a wool washing plant, for instance, since seepage of liquid into the lubricant-containing rebates and adulteration of the lubricant are prevented.

It has also been found that the performance of wool squeezing rollers, for example, is considerably enhanced by the present invention since not only is localized compression permitted to accommodate the passage of matted lumps of materials, but also restricted local creeping of the units on the spindle can take place without risk of undue wear of or damage to the inner circumference of the units and the surface of the roller spindle. Considerably increased loads can therefore be borne by such rollers.

Finally, the wearing properties of a roller are considerably improved by employing bonded metal or other bushes in the bore of the roller covering, for they serve to restrict undue deformation of the rubber annulus when subjected to very heavy loads, and reduce any rise of temperature of the rubber that might otherwise take place and be detrimental to the rubber. Consequently, the load capacity of a roller is considerably augmented and failure of the rubber is virtually eliminated.

What I claim is:

1. A resilient roller comprising in combination a cylindrical spindle, a plurality of smooth-bored cylindrical units each including an annulus of elastomeric material assembled in juxtaposition on said spindle, said units when so assembled forming annular open end receptacles for lubricant with said open end facing the periphery of said spindle, and means for axially compressing said units together detachably mounted on and connected to said spindle, each said unit having two faces lying in planes normal to the axis of the unit and having formed in one of said faces at least one circumferential groove and in the other of said faces at least one complementary circumferential rib engaging with the respective circumferential groove of an adjacent unit.

2. A resilient roller comprising in combination, a spindle, a plurality of smooth-bored cylindrical units assembled in juxtaposition on said spindle and each composed of a compressible annulus of elastomeric material and a smooth-bored annular relatively hard bush to which said annulus is secured, the axial width of said bush being less than that of said annulus with adjacent bushes being thereby spaced apart by their annuluses, and means for axially compressing said units together on said spindle, each said annulus having at least one circumferential rebate bordering its inner periphery and forming between each pair of adjacent units in their axially compressed condition an annular receptacle for lubricant with the spaces between said bushes.

3. A resilient roller comprising in combination, a spindle, a plurality of smooth-bored cylindrical units assembled in juxtaposition on said spindle and each composed of an annulus of elastomeric material and a smooth-bored annular relatively hard bush to which said annulus is secured, the axial width of each said bush being less than that of said annulus with adjacent annuluses thereby spacing their bushes axially apart and means for axially compressing said units together on said spindle, adjacent units when so assembled forming with the space between their bushes annular receptacles for a lubricant and each said annulus having two faces lying in planes normal to the axis of the unit and being formed in one of said faces with at least one groove and in the other of said faces with at least one complementary circumferential rib engaging with the respective circumferential groove of an adjacent unit.

4. A resilient roller comprising in combination, a spindle, a plurality of smooth-bored cylindrical units assembled in juxtaposition on said spindle, and means for axially compressing said units together on said spindle, each said unit being composed of an outer compressible annulus of elastomeric material having two end faces lying in planes normal to the axis of the unit and an inner smooth-bored annular relatively hard bush, said annuluses in their axially compressed condition spacing apart adjacent bushes to which said annuluses are secured, each said annulus being formed on at least one of its end faces with a circumferential rebate bordering its inner periphery and flared outwards from the minimum width of the annulus, and being formed on one of its end faces with a circumferential groove and on the other of said faces with a circumferential rib corresponding to said groove.

5. A resilient roller comprising in combination, a spindle, a plurality of smooth-bored cylindrical units each including an annulus of elastomeric material rotatably mounted in juxtaposition on said spindle, each said unit having at least one circumferential rebate bordering its inner periphery forming an annular open end receptacle for a lubricating material closed by said spindle, a mass of a graphitic lubricating material positioned in each said receptacle and contacting said spindle and means for axially compressing said units together mounted on and connected to said spindle for rotation therewith.

References Cited in the file of this patent

UNITED STATES PATENTS

| | | |
|---|---|---|
| 39,201 | Holly | July 7, 1863 |
| 202,992 | Clark | Apr. 30, 1878 |
| 277,154 | Osborne | May 8, 1883 |
| 993,222 | Busby | May 23, 1911 |
| 1,569,536 | Crysler | Jan. 12, 1926 |
| 2,266,506 | Morse | Dec. 16, 1941 |
| 2,546,200 | Snavely | Mar. 27, 1951 |

FOREIGN PATENTS

| | | |
|---|---|---|
| 260,040 | Great Britain | 1926 |